(12) United States Patent  
Hong

(10) Patent No.: US 11,089,543 B2  
(45) Date of Patent: Aug. 10, 2021

(54) COMMUNICATION METHOD AND DEVICE FOR INDICATING AN OPERATING FREQUENCY RANGE

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 170 days.

(21) Appl. No.: 16/349,230

(22) PCT Filed: Nov. 11, 2016

(86) PCT No.: PCT/CN2016/105488  
§ 371 (c)(1),  
(2) Date: May 10, 2019

(87) PCT Pub. No.: WO2018/086067  
PCT Pub. Date: May 17, 2018

(65) Prior Publication Data  
US 2019/0281543 A1    Sep. 12, 2019

(51) Int. Cl.  
*H04W 48/20*  (2009.01)  
*H04W 76/15*  (2018.01)  
(Continued)

(52) U.S. Cl.  
CPC .......... *H04W 48/20* (2013.01); *H04L 5/0032* (2013.01); *H04W 28/0215* (2013.01);  
(Continued)

(58) Field of Classification Search  
CPC ..... H04W 48/20; H04W 76/15; H04W 76/10; H04W 28/0215; H04W 48/08; H04L 5/0032  
See application file for complete search history.

(56) References Cited

U.S. PATENT DOCUMENTS

| 2012/0071200 A1* | 3/2012 | Bienas | H04W 48/20 455/525 |
| 2012/0083309 A1* | 4/2012 | Kwon | H04B 17/382 455/522 |
| 2012/0176958 A1* | 7/2012 | Queseth | H04B 7/15542 370/315 |

FOREIGN PATENT DOCUMENTS

| CN | 101835200 A | 9/2010 |
| CN | 101873648 A | 10/2010 |

(Continued)

OTHER PUBLICATIONS

First Office Action issued to Chinese Patent Application No. 201680001417.7 dated Mar. 14, 2019 and English translation, (14p).

(Continued)

*Primary Examiner* — Ian N Moore  
*Assistant Examiner* — Latresa A McCallum  
(74) *Attorney, Agent, or Firm* — Arch & Lake LLP

(57) ABSTRACT

The present disclosure provides a communication method and device and belongs to the field of mobile communication technologies. The method comprises: acquiring system information of a plurality of base stations, wherein the system information comprises first bandwidth information of the base station, and the first bandwidth information is used to indicate an operating frequency range supported by the base station during carrier aggregation; selecting a target base station from the plurality of base stations based on a plurality of pieces of first bandwidth information and second bandwidth information that the UE is configured; and sending a connection request to the target base station.

5 Claims, 7 Drawing Sheets

(51) Int. Cl.
*H04L 5/00* (2006.01)
*H04W 28/02* (2009.01)
*H04W 48/08* (2009.01)
*H04W 76/10* (2018.01)

(52) U.S. Cl.
CPC .......... *H04W 48/08* (2013.01); *H04W 76/10* (2018.02); *H04W 76/15* (2018.02)

(56) References Cited

FOREIGN PATENT DOCUMENTS

| CN | 102668670 A | 9/2012 |
|---|---|---|
| CN | 105722190 A | 6/2016 |
| CN | 105991255 A | 10/2016 |

OTHER PUBLICATIONS

R2-163975, System Information Design for Standalone NR Operation, NTT Docomo, Inc., 3GPP TSG-RAN WG2#94, May 27, 2016, Nanjing, China, (2p).

International Search Report (including English translation) and Written Opinion of PCT/CN2016/105488, dated Jul. 27, 2017, 13 pages.

Notification to Grant Patent Right for Invention of Chinese Application No. 201680001417.7 dated Jul. 10, 2019 with English translation, (8p).

\* cited by examiner

COMMUNICATION METHOD AND DEVICE FOR INDICATING AN OPERATING FREQUENCY RANGE

CROSS REFERENCE TO RELATED APPLICATIONS

This application is a National Stage of International Application No. PCT/CN2016/105488, filed on Nov. 11, 2016, the disclosure of which is incorporated herein by reference in its entirety.

TECHNICAL FIELD

The present disclosure relates to the field of mobile communication technologies, and in particular, to a communication method and device

BACKGROUND

In recent years, in order to provide better communication services for a user equipment (UE), the mobile communication technologies have been developed rapidly. In a current communication system, a UE accesses to a base station by means of active search, and the base station provides communication services for the UE.

The UE may actively search for the base station when being started or performing base station reselection. If the UE is within the coverage area of a plurality of base stations, the UE may acquire both synchronization information and system information which are broadcast by the plurality of base stations, select one base station with better signal quality and then communicate with this base station according to both the synchronization information and system information of this base station.

During the process of implementing the present disclosure, the inventor has found that the following problems at least exist:

Nowadays, the development of 5G (5th-Generation, fifth-generation mobile communication technology) has become an inevitable trend, and the UE will generate higher transmission rate demand.

SUMMARY

In order to overcome the problems in the related art, the embodiments of the present disclosure provide a communication method and device. The technical solutions are as follows.

In an aspect, there is provided a communication device, applied to a user equipment (UE), comprising:
a processor; and
a memory for storing a processor-executable instruction, wherein
the processor is configured to:
acquire system information of a plurality of base stations, wherein the system information comprises first bandwidth information of the base station, and the first bandwidth information is used to indicate an operating frequency range supported by the base station during carrier aggregation;
select a target base station from the plurality of base stations based on a plurality of pieces of first bandwidth information and second bandwidth information that the UE is configured, wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation; and
send a connection request to the target base station, wherein the connection request is used to instruct the UE to communicate with the target base station.

In another aspect, there is provided a communication device, applied to a base station, comprising:
a processor; and
a memory for storing a processor-executable instruction, wherein
the processor is configured to broadcast system information, wherein the system information comprises first bandwidth information of a base station, and the first bandwidth information is used to indicate an operating frequency range supported by the base station during carrier aggregation; and
receive a connection request sent by a user equipment (UE), wherein the connection request is used to instruct the UE to communicate with the base station;
wherein the connection request is a connection request sent by the UE to a target base station which is selected from the plurality of base stations based on the plurality of pieces of first bandwidth information and second bandwidth information that the UE is configured,
wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

In yet another aspect, there is provided a communication device, applied to a base station, comprising:
a processor; and
a memory for storing a processor-executable instruction, wherein
the processor is configured to:
receive a system information request sent by a user equipment (UE), wherein the system information request is used to instruct the base station to send system information to the UE;
send the system information to the UE based on the system information request, wherein the system information comprises first bandwidth information of the base station, and the first bandwidth information is used to indicate an operating frequency range supported by the base station during carrier aggregation; and
receive a connection request sent by the UE, wherein the connection request is used to instruct the UE to communicate with the base station;
wherein the connection request is a connection request sent by the UE to a target base station which is selected from the plurality of base stations based on the plurality of pieces of first bandwidth information and second bandwidth information that the UE is configured,
wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure will be described in further detail with reference to the accompanying drawings, to present the objects, technical solutions, and advantages of the present disclosure clearer.

The operating frequency range supported by the base station selected by the current UE probably cannot meet the transmission rate required by the UE. Therefore, there is an urgent need for a more reasonable communication method so as to enable the UE to be able to select the base station which best meets its own transmission rate demand.

Figure 1:
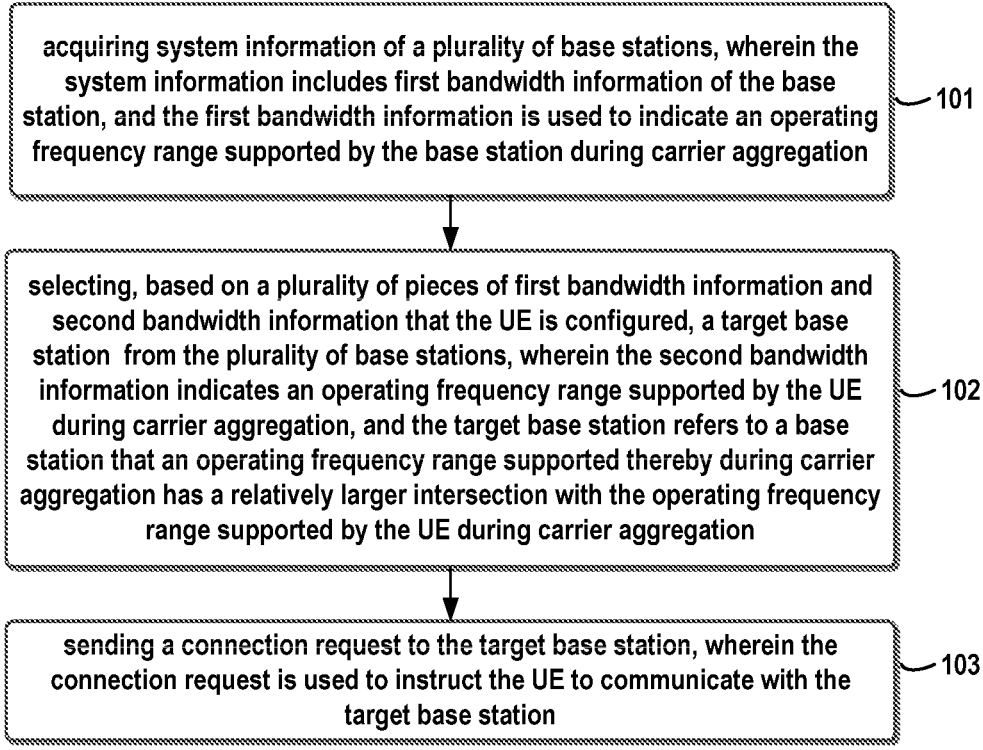
FIG. 1 is a flow chart of a communication method shown according to one exemplary embodiment.

FIG. 1 is a flow chart of a communication method shown according to one exemplary embodiment. As shown in FIG. 1, this embodiment is applied to a user equipment (UE) and specifically includes the following steps.

In step 101, acquiring system information of a plurality of base stations, wherein the system information includes first bandwidth information of the base station, and the first bandwidth information is used to indicate an operating frequency range supported by the base station during carrier aggregation.

In step 102, selecting, based on a plurality of pieces of first bandwidth information and second bandwidth information that the UE is configured, a target base station from the plurality of base stations, wherein the second bandwidth information indicates an operating frequency range supported by the UE during carrier aggregation, and the target base station refers to a base station that an operating frequency range supported thereby during carrier aggregation has a relatively larger intersection with the operating frequency range supported by the UE during carrier aggregation.

In step 103, sending a connection request to the target base station, wherein the connection request is used to instruct the UE to communicate with the target base station.

In the related art, the development of 5G has become an inevitable trend, and the UE requires higher transmission rate. However, the operating frequency range supported by the base station selected by the current UE probably cannot meet the transmission rate required by the UE. Therefore, there is an urgent need for a more reasonable communication method so as to enable the UE to be able to select the base station which best meets its own transmission rate demand.

In some embodiments of the present disclosure, by acquiring the system information, which includes the first bandwidth information, of the plurality of base stations, the UE may acquire the operating frequency range which may be provided for the UE by each base station, respectively; so that the UE may select a target base station of which the operating frequency range has the relatively larger intersection with the its own operating frequency range. As such, the target base station not only meets the demand of the operating frequency range of the UE, but also may provide relatively larger transmission bandwidth for the UE. Therefore, the transmission rate demand of the UE may be met as far as possible.

In one example, the step of selecting, based on a plurality of a first bandwidth information and a second bandwidth information that the UE is configured, a target base station from the plurality of base stations includes:

for each piece of first bandwidth information in the plurality of pieces of first bandwidth information, analyzing an intersection between the operating frequency range indicated by the first bandwidth information and the operating frequency range indicated by the second bandwidth information;

determining a frequency range of the intersection; and determining a base station with a largest frequency range of the intersection as the target base station.

In some embodiments of the disclosure, the method further includes: if synchronization information of any base station is acquired, and system information of the base station is not acquired within a preset duration, sending a system information request to the base station, wherein the system information request is used to instruct the base station to send the system information to the UE.

All of the above optional technical solutions may form optional embodiments of the present disclosure in any combined manner, which is not described herein.

Figure 2:
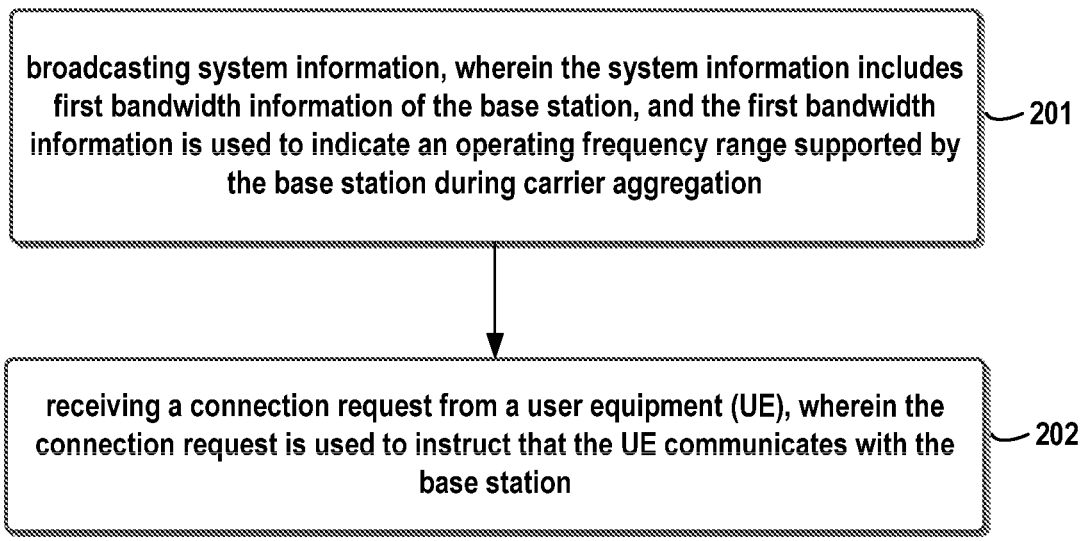
FIG. 2 is a flow chart of a communication method shown according to one exemplary embodiment.

FIG. 2 is a flow chart of a communication method shown according to one exemplary embodiment. As shown in FIG. 2, this embodiment is applied to a base station and specifically includes the following steps.

In step 201, broadcasting system information, wherein the system information includes first bandwidth information of the base station, and the first bandwidth information is used to indicate an operating frequency range supported by the base station during carrier aggregation.

In step 202, receiving a connection request from a user equipment (UE), wherein the connection request is used to instruct that the UE communicates with the base station.

In the related art, the development of 5G has become an inevitable trend, and the UE will generate higher transmission rate demand. However, the operating frequency range supported by the base station selected by the current UE probably cannot meet the transmission rate requested by the UE. Therefore, there is an urgent need for a more reasonable communication method so as to enable the UE to be able to select the base station which best meets its own transmission rate demand.

In some embodiments of the present disclosure, any base station may broadcast the system information which includes the first bandwidth information, so that the UE may acquire the operating frequency range which may be provided for the UE by each base station, respectively; and then select one base station of which the operating frequency range has the relatively larger intersection with its own operating frequency range. As such, the base station not only meets the demand of the operating frequency range of the UE, but also may provide relatively larger transmission bandwidth for the UE. Therefore, the transmission rate demands of the UE may be met as far as possible.

Figure 3:
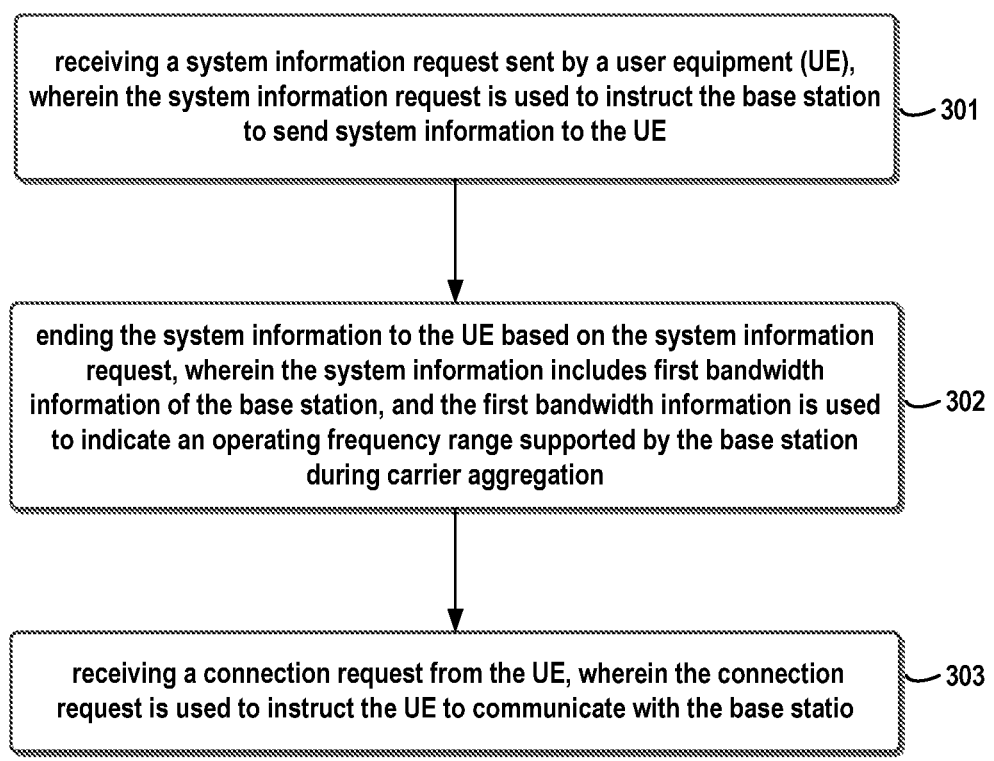
FIG. 3 is a flow chart of a communication method shown according to one exemplary embodiment.

FIG. 3 is a flow chart of a communication method shown according to one exemplary embodiment. As shown in FIG. 3, this embodiment is applied to a base station and specifically includes the following steps.

In step 301, receiving a system information request sent by a user equipment (UE), wherein the system information request is used to instruct the base station to send system information to the UE.

In step 302, sending the system information to the UE based on the system information request, wherein the system information includes first bandwidth information of the base station, and the first bandwidth information is used to indicate an operating frequency range supported by the base station during carrier aggregation.

In step 303, receiving a connection request from the UE, wherein the connection request is used to instruct the UE to communicate with the base station.

In the related art, the development of 5G has become an inevitable trend, and the UE will generate higher transmission rate demand. However, the operating frequency range supported by the base station selected by the current UE probably cannot realize the transmission rate required by the UE. Therefore, there is an urgent need for a more reasonable communication method so as to enable the UE to be able to select the base station which best meets its own transmission rate demand.

In some embodiments of the present disclosure, any base station may provide the system information, which includes the first bandwidth information, for the UE according to demand of the UE, so that the UE may determine the operating frequency range which may be provided by each base station respectively, and then select one base station of which the operating frequency range has the relatively larger intersection with its own operating frequency range. As such, the base station not only meets the demand of the operating frequency range of the UE, but also may provide relatively larger transmission bandwidth for the UE. Therefore, the transmission rate demand of the UE may be met as far as possible.

In some embodiments of the present disclosure, the system information may be broadcast by the base station periodically, or may be sent to a UE according to an actively request from the UE. Therefore, the first mode of broadcasting the system information will be described in the embodiment refers to FIG. 4, and the second mode of requesting the system information will be described in the embodiment refers to FIG. 6. As for the UE, the plurality of pieces of acquired system information may be received from the system information which is broadcast by the base station, or may be received from the system information which is sent by the base station according to an actively request from the UE.

Figure 4:
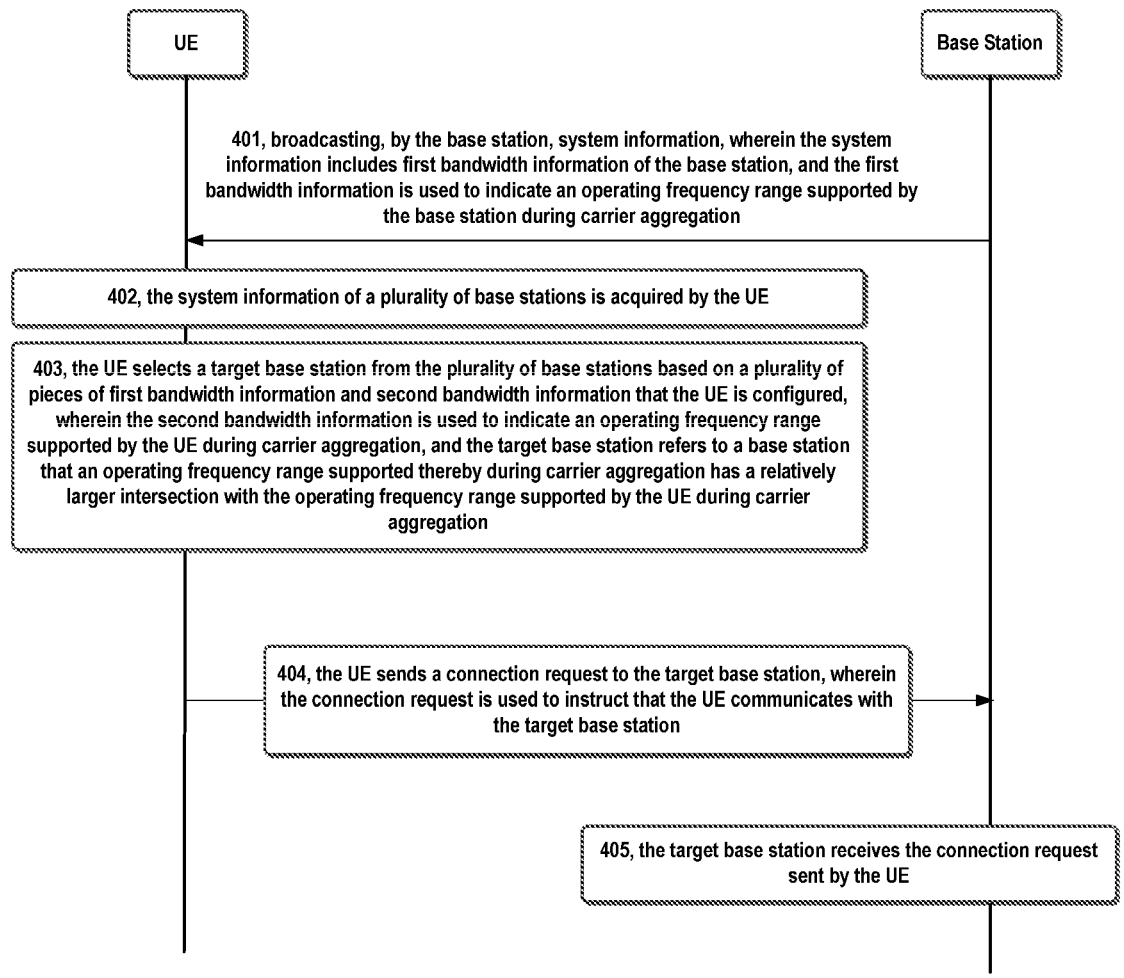
FIG. 4 is a flow chart of a communication method shown according to one exemplary embodiment.

FIG. 4 is a flow chart of a communication method shown according to one exemplary embodiment. As shown in FIG. 4, this embodiment is applied to an interaction process between a base station and a user equipment (UE) and specifically includes the following steps.

In step 401, 402.

The carrier aggregation refers to a technology that a base station schedules and occupies operating bandwidths of other base stations so as to increase the transmission bandwidth when the base station communicates with the UE. Since frequency bands and operating bandwidths which are allocated by an operator are different, the possible modes of the carrier aggregation are intra-band carrier aggregation (including intra-band contiguous carrier aggregation and intra-band non-contiguous carrier aggregation), and inter-band carrier aggregation. The mode of carrier aggregation, bandwidth and the number of the base station are not limited in this embodiment.

Figure 5:
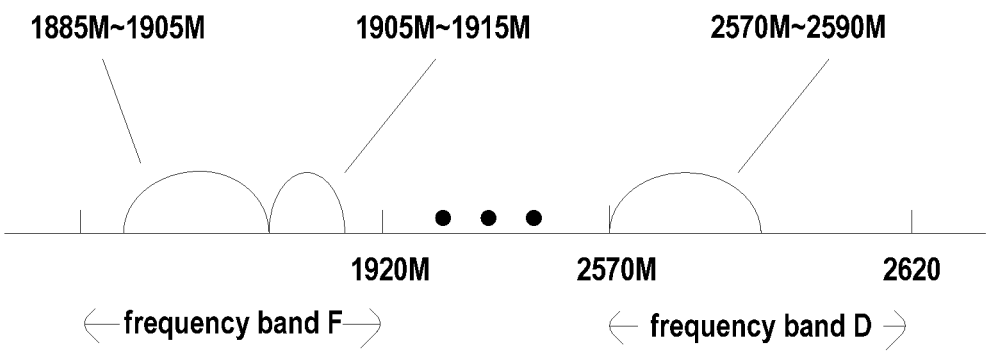
FIG. 5 is a diagram of carrier aggregation shown according to one exemplary embodiment.

For example, FIG. 5 is a diagram of carrier aggregation shown according to one exemplary embodiment. As shown in FIG. 5, the operating bandwidth of the base station is 20M and is within 1885M-1905M in a frequency band F, and the base station supports carrier aggregation with 1905M-1915M in the frequency band F and 2570M-2590M in a frequency band D, respectively, so that the transmission bandwidth provided by the base station is increased from 20M to 50M. Therefore, the first bandwidth information of the base station includes 1885M-1915M and 2570M-2590M. Of course, in order to provide a higher transmission rate for the UE in the 5G network, the transmission bandwidth of the base station may be increased to 1G by aggregating 125 operating bandwidths of 80M. It should be noted that the mode of indicating the operating frequency range by the first bandwidth information is not limited in embodiments of the present disclosure. For example, the first bandwidth information may include the value of the operating frequency range, thereby directly indicating the operating frequency range supported by the base station during carrier aggregation. Again for example, the first bandwidth information may include at least one frequency range label corresponding to the operating frequency range, and the frequency range label is used to uniquely identify a frequency range.

The system information refers to basic information which the UE required to access the base station, including information such as operating bandwidth, a system frame number, and the number of antennas. In some embodiments of the present disclosure, in order to enable the UE to determine whether the operating frequency range supported by the base station meets its own demand, the system information includes the first bandwidth information.

In this step, any base station may periodically broadcast the system information. The broadcasting period of the system information and corresponding time/frequency resources are not limited in embodiments of the present disclosure. Generally, the broadcast period is 10 milliseconds, the time domain resource corresponding to the system information is subframe 0 and the frequency domain resource corresponding to the system information is a central frequency band (1.08M) of the base station.

In step 402, the system information of a plurality of base stations is acquired by the UE.

In some embodiments of the present disclosure, the UE may search for the system information of the base station on a configured communication frequency point. Since the coverage area of the base stations overlaps usually, a plurality of the system information of base stations may be acquired through searching when the UE is within the coverage area of the plurality of base stations. The expression "a plurality of" in this embodiment refers to two or more. Of course, the system information acquired by the UE in this step may also include system information acquired in a request mode. This request mode is specifically described in the embodiment of FIG. 6. The acquisition time is not limited in embodiments of the present disclosure. For example, the UE may perform acquisition when being started or performing base station reselection.

It should be noted that when searching for the base station, usually the UE searches for synchronization information of the base station firstly. The synchronization information, in the central frequency band of the base station, is used to perform time domain synchronization between the UE and the base station. Therefore, once the synchronization information of the base station is acquired through searching on certain communication frequency point, the UE may continue to search for the system information in the central frequency band where the frequency point is located.

In step 403, the UE selects a target base station from the plurality of base stations based on a plurality of pieces of first bandwidth information and second bandwidth information that the UE is configured, wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

In this step, the UE analyses the plurality of pieces of acquired first bandwidth information based on the second bandwidth information that the UE is configured, determines an intersection of the operating frequency range supported by any base station during carrier aggregation and the operating frequency range supported by the UE during carrier aggregation, and selects a base station that the operating frequency range supported thereby has a relatively larger intersection with the operating frequency range supported by the UE, as the target base station so as to meet the transmission rate demand of the UE as far as possible. The mode of carrier aggregation, bandwidth and the number of the UE are not limited in embodiments. For example, since the UE supports carrier aggregation with 1885M-1905M and 1905M-1915M in the frequency band F and 2570M-2590M in the frequency band D, respectively, and the second bandwidth information of the UE includes 1885M-1915M and 2570M-2590M. It should be noted that the second bandwidth information is similar to the first bandwidth information and the mode of indicating the operating frequency range by the second bandwidth information is not limited in embodiments of the present disclosure.

The specific process of selecting the target base station is not limited in embodiments of the present disclosure. For example, the selection process is as follows: for each piece of first bandwidth information in the plurality of pieces of first bandwidth information, an intersection between the operating frequency range indicated by the first bandwidth information and the operating frequency range indicated by the second bandwidth information; determining a frequency range of the intersection; and determining a base station with a largest frequency range of the intersection, as the target base station.

According to the enumerated selection process, if each of the first bandwidth information and the second bandwidth information includes a value of the operating frequency range, for example, the second bandwidth information of the UE includes B1 (3600M-4600M) and the two pieces of first bandwidth information acquired by the UE include B2 (3600M-4000M) and B3 (3600M-4600M), the UE may determine that the intersection of B1 with B2 is 3600M-4000M and the intersection of B1 with B3 is 3600M-4600M, acquires that the value of the frequency range of the intersection of B1 and B2 is 400M and the value of the frequency range of the intersection of B1 and B3 is 1000M by calculation, determines that the value of the frequency range of the intersection of B1 and B3 is largest by comparing the values of the frequency ranges of the two intersections, and thus determines the base station corresponding to B3 as the target base station.

In addition, if each of the first bandwidth information and the second bandwidth information includes a frequency range label corresponding to the operating frequency range, for example, the second bandwidth information data1 of the UE includes C1 (3600M-3680M), C2 (3680M-3760M), and C3 (3760M-3840M), and the first bandwidth information data2 acquired by the UE includes C1 (3600M-4000M) and C2 (3680M-3760M), and the first bandwidth information data3 acquired by the UE includes C1 (3600M-4600M), C2 (3680M-3760M), C3 (3760M-3840M) and C4 (3840M-3920M), the UE may determine that the intersection of the operating frequency ranges indicated by data1 and data2 is C1 and C2, the intersection of the operating frequency ranges indicated by data1 and data3 is C1, C2, and C3, and thus may determine the base station corresponding to data3 as the target base station.

In fact, the selection process in this step may comprehensively consider other factors, and is not limited to the signal quality or access priority of the base station. For example, the second bandwidth information of the UE includes B1 and three pieces of first bandwidth information, including B4, B5 and B6, are acquired. B1 is 3600M-4600M, B4 is 3600M-4000M, B5 is 3600M-4600M and B6 is 3600M-4600M. At this time, the intersection of B1 with B5 and the intersection of B1 with B6 are relatively larger and the two intersections are the same. Therefore, the UE may measure the signal quality of the base stations respectively corresponding to B5 and B6, and then determines the base station with the best signal quality as the target base station.

In step 404, the UE sends a connection request to the target base station, wherein the connection request is used to instruct that the UE communicates with the target base station.

Based on the above step 403, the UE may select one target base station to be resident on. When a communication process is triggered, the UE may generate the connection request and send the same to the target base station.

In step 405, the target base station receives the connection request sent by the UE.

When receiving the connection request sent by the UE, the target base station may establish a connection with the UE and performs a subsequent communication process with the UE.

It should be noted that the operating frequency range supported by the base station (or UE) during carrier aggregation shows the carrier aggregation capability of the base station (or UE), and does not means that the base station (or UE) must use the frequency within the operating frequency range to communicate during communication. The transmission bandwidth which is adopted by the UE to communicate with the target base station is not limited in embodiments of the present disclosure. For example, the transmission bandwidth is decided according to the scheduling demand of the current base station (or UE). If the current UE does not have a relatively high transmission rate demand, the target base station may use its own operating bandwidth to communicate with the UE. Again for example, the transmission bandwidth is decided according to transmission resources allocated by the carrier operator.

In the related art, the development of 5G has become an inevitable trend, and the UE will generate higher transmission rate demand. However, the operating frequency range supported by the base station selected by the current UE probably cannot meet the transmission rate required by the UE. Therefore, there is an urgent need for a more reasonable communication method so as to enable the UE to be able to select the base station which best meets its own transmission rate demand.

In some embodiments of the present disclosure, by acquiring the system information of the plurality of base stations, which includes the first bandwidth information, the UE may determine the operating frequency range which may be provided by each base station, so that the UE may select one target base station of which the operating frequency range has the relatively larger intersection with the its own operating frequency range. As such, the target base station not only meets the demand of the operating frequency range of the UE, but also may provide relatively larger transmission bandwidth for the UE. Therefore, the transmission rate demand of the UE may be met as far as possible.

Figure 6:
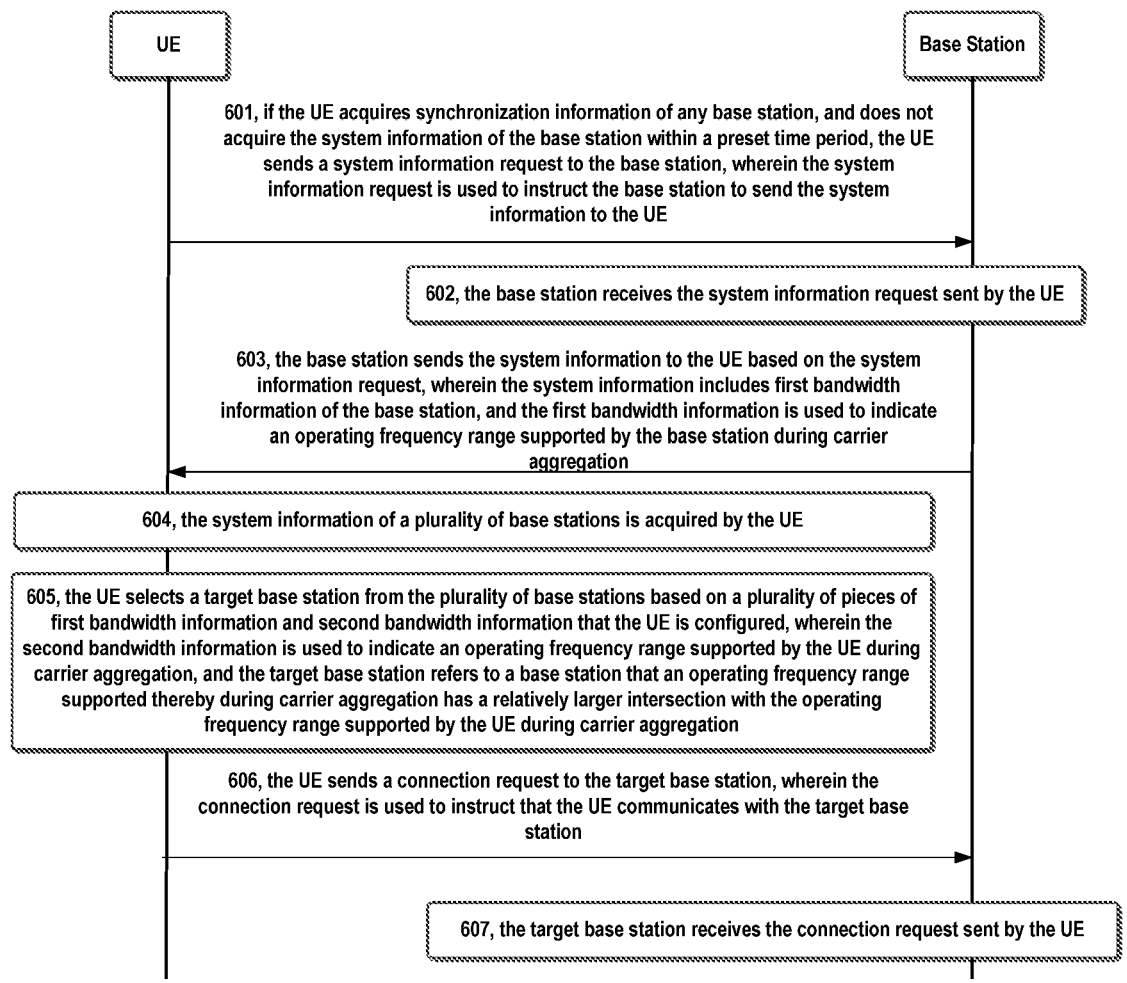
FIG. 6 is a flow chart of a communication method shown according to one exemplary embodiment.

FIG. 6 is a flow chart of a communication method shown according to one exemplary embodiment. As shown in FIG. 6, this embodiment is applied to an interaction process of a base station and a user equipment (UE) and specifically includes the following steps.

In step 601, if the UE acquires synchronization information of any base station, and does not acquire the system information of the base station within a preset time period, the UE sends a system information request to the base station, wherein the system information request is used to instruct the base station to send the system information to the UE.

In some embodiments, the base station, which is different from the base station that periodically broadcasts the system information, provides the system information for the UE according to demand of the UE, so that time/frequency resources occupied by broadcasting the system information may be saved. Therefore, for the UE, if the UE acquires the synchronization information of the base station, it indicates that the UE is within the coverage area of the base station and the base station is likely to support communication with the UE. Further, the UE may search for the system information in the central frequency band of the base station. If the system information is not acquired in the preset time period, the UE may generate the system information request and modulates the system information request to the frequency in the central frequency band, thereby sending the system information request to the base station. The system information request carries a UE identifier of the UE and the UE identifier is not limited to a sim (subscriber identity module) card identifier.

The present time period has been configured to the UE and is not limited in embodiments of the present disclosure. For example, the preset time period is one frame (10 milliseconds). In addition, the time that the UE acquires the synchronization information is not limited in embodiments of the present disclosure. For example, the UE performs acquisition when being started or performing base station reselection.

In step 602, the base station receives the system information request sent by the UE.

In this step, the base station may monitor the system information request sent by the UE in its own central frequency band and receive the same.

In step 603, the base station sends the system information to the UE based on the system information request, wherein the system information includes first bandwidth information of the base station, and the first bandwidth information is used to indicate an operating frequency range supported by the base station during carrier aggregation.

The base station may modulate the received system information request to the frequency in the central frequency band of the base station according to the UE identifier carried in the system information request, and sends the system information to the UE with the UE identifier.

In step 604, the system information of a plurality of base stations is acquired by the UE.

This step is the same as step 402.

In addition, regardless of whether the base station broadcasts the system information or the system information sent according to the demand of the UE, the UE may search the system information in the central frequency band of the base station.

In step 605, the UE selects a target base station from the plurality of base stations based on a plurality of pieces of first bandwidth information and second bandwidth information that the UE is configured, wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

This step is the same as step 403 and is not described herein.

In step 606, the UE sends a connection request to the target base station, wherein the connection request is used to instruct that the UE communicates with the target base station.

This step is the same as step 404 and is not described herein.

In step 607, the target base station receives the connection request sent by the UE.

This step is the same as step 405 and is not described herein.

In the related art, the development of 5G has become an inevitable trend, and the UE will generate higher transmission rate demand. However, the operating frequency range supported by the base station selected by the current UE probably cannot meet the transmission rate required by the UE. Therefore, there is an urgent need for a more reasonable communication method so as to enable the UE to be able to select the base station which best meets its own transmission rate demand.

In some embodiments of the present disclosure, by acquiring the system information, which includes the first bandwidth information, of the plurality of base stations, the UE may determine the operating frequency range which may be provided for the UE by each base station, respectively, so that the UE may select one target base station of which the operating frequency range has the relatively larger intersection with its own operating frequency range. As such, the target base station not only meets the demand of the operating frequency range of the UE, but also may provide relatively larger transmission bandwidth for the UE. Therefore, the transmission rate demand of the UE may be met as far as possible.

Figure 7:
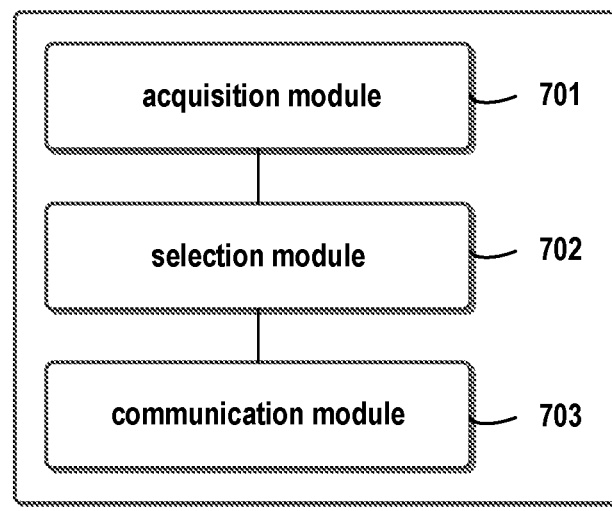
FIG. 7 is a block diagram of a communication device shown according to one exemplary embodiment.

FIG. 7 is a block diagram of a communication device shown according to one exemplary embodiment. With reference to FIG. 7, the device includes an acquisition module 701, a selection module 702 and a communication module 703.

The acquisition module 701 is configured to acquire system information of a plurality of base stations, wherein the system information includes first bandwidth information of the base station, and the first bandwidth information is used to indicate an operating frequency range supported by the base station during carrier aggregation.

The selection module 702 is configured to select a target base station from the plurality of base stations based on a plurality of pieces of first bandwidth information and second bandwidth information that the UE is configured, wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

The communication module 703 is configured to send a connection request to the target base station, wherein the connection request is used to instruct that the UE communicates with the target base station.

In the related art, the development of 5G has become an inevitable trend, and the UE will generate higher transmission rate demand. However, the operating frequency range supported by the base station selected by the current UE probably cannot realize the transmission rate required by the UE. Therefore, there is an urgent need for a more reasonable communication method so as to enable the UE to be able to select the base station which best meets its own transmission rate demands.

In some embodiments of the present disclosure, by acquiring the system information of the plurality of base stations, which includes the first bandwidth information, the UE may determine the operating frequency range which may be provided for the UE by each base station, respectively, so that the UE may select one target base station of which the operating frequency range has the relatively larger intersection with its own operating frequency range. As such, the target base station not only meets the demand of the operating frequency range of the UE, but also may provide relatively larger transmission bandwidth for the UE, Therefore, the transmission rate demand of the UE may be met as far as possible.

In one example, the selection module 702 is configured to: for each piece of first bandwidth information in the plurality of pieces of first bandwidth information, analyses an intersection between the operating frequency range indicated by the first bandwidth information and the operating frequency range indicated by the second bandwidth information; calculate the value of the frequency range of the intersection; and determine a base station, corresponding to which the frequency range of the intersection is maximum, as the target base station.

In one example, the communication module 703 is further configured to: if synchronization information of any base station is acquired, and system information of the base station is not acquired within a preset time period, send a system information request to the base station, wherein the system information request is used to instruct the base station to send the system information to the UE.

All of the above optional technical solutions may form optional embodiments of the present disclosure in any combined manner, which is not described herein.

Figure 8:
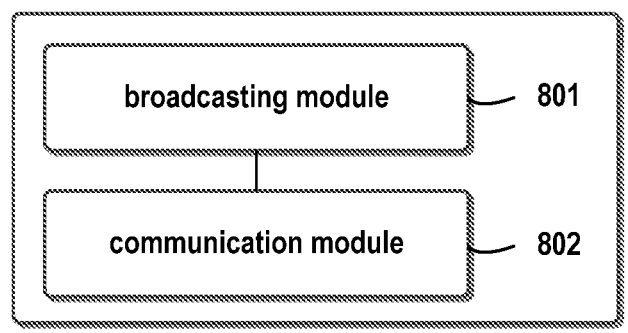
FIG. 8 is a block diagram of a communication device shown according to one exemplary embodiment.

FIG. 8 is a block diagram of a communication device shown according to one exemplary embodiment. With reference to FIG. 8, the device includes a broadcasting module 801 and a communication module 802.

The broadcasting module 801 is configured to broadcast system information, wherein the system information includes first bandwidth information of a base station, and the first bandwidth information is used to indicate an operating frequency range supported by the base station during carrier aggregation.

The communication module 802 is configured to receive a connection request sent by a user equipment (UE), wherein the connection request is used to instruct the UE to communicate with the base station.

In the related art, the development of 5G has become an inevitable trend, and the UE will generate higher transmission rate demand. However, the operating frequency range, supported by the base station, selected by the current UE probably cannot meets the transmission rate required by the UE. Therefore, there is an urgent need for a more reasonable communication method so as to enable the UE to be able to select the base station which best meets its own transmission rate demand.

In some embodiments of the present disclosure, any base station may broadcast the system information which includes the first bandwidth information, so that the UE may determine the operating frequency range which may be provided for the UE by each base station, respectively, and then select one base station of which the operating frequency range has the relatively larger intersection with the its own operating frequency range. As such, the base station not only meets the demand of the operating frequency range of the UE, but also may provide relatively larger transmission bandwidth for the UE. Therefore, the transmission rate demand of the UE may be met as far as possible.

Figure 9:
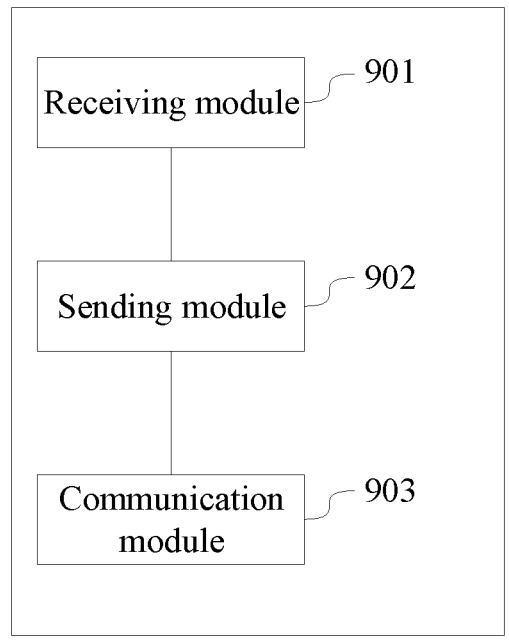
FIG. 9 is a block diagram of a communication device shown according to one exemplary embodiment.

FIG. 9 is a block diagram of a communication device shown according to one exemplary embodiment. With reference to FIG. 9, the device includes a receiving module 901, a sending module 902 and a communication module 903.

The receiving module 901 is configured to receive a system information request sent by a user equipment (UE), wherein the system information request is used to instruct a base station to send system information to the UE.

The sending module 902 is configured to send the system information to the UE based on the system information request, wherein the system information includes first bandwidth information of the base station, and the first bandwidth information is used to indicate an operating frequency range supported by the base station during carrier aggregation.

The communication module 903 is configured to receive a connection request sent by the UE, wherein the connection request is used to instruct the UE to communicate with the target base station.

In the related art, the development of 5G has become an inevitable trend, and the UE will generate higher transmission rate demand. However, the operating frequency range supported by the base station selected by the current UE probably cannot realize the transmission rate required by the UE. Therefore, there is an urgent need for a more reasonable communication method so as to enable the UE to be able to select the base station which best meets its own transmission rate demand.

In some embodiments of the present disclosure, any base station may provide the system information, which includes first bandwidth information, for the UE according to demand of the UE, so that the UE may determine an operating frequency range which may be provided for the UE by each base station, respectively, and select one base station of which an operating frequency range has the relatively larger intersection with the its own operating frequency range. In addition, the base station not only conforms to the operating frequency range of the UE, but also may provide relatively larger transmission bandwidth for the UE. Therefore, the transmission rate demand of the UE may be met as far as possible.

Figure 10:
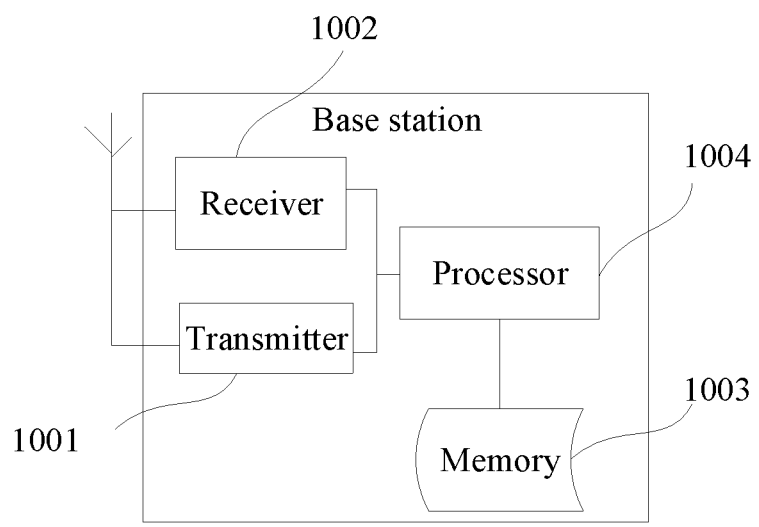
FIG. 10 is a structural diagram of a base station shown according to one exemplary embodiment.

FIG. 10 is a structural diagram of a base station shown according to one exemplary embodiment. As shown in FIG. 10, the base station includes a transmitter 1001, a receiver 1002, a memory 1003, and a processor 1004 which is connected to the transmitter, the receiver and the memory respectively. Of course, the base station may further include general components such as an antenna, a baseband processing component, an intermediate radio frequency processing component and an input/output device, which is not limited in this embodiment. The processor 1004 is configured to implement the method at the base station side in any possible implementation mode provided in the above embodiment.

Figure 11:
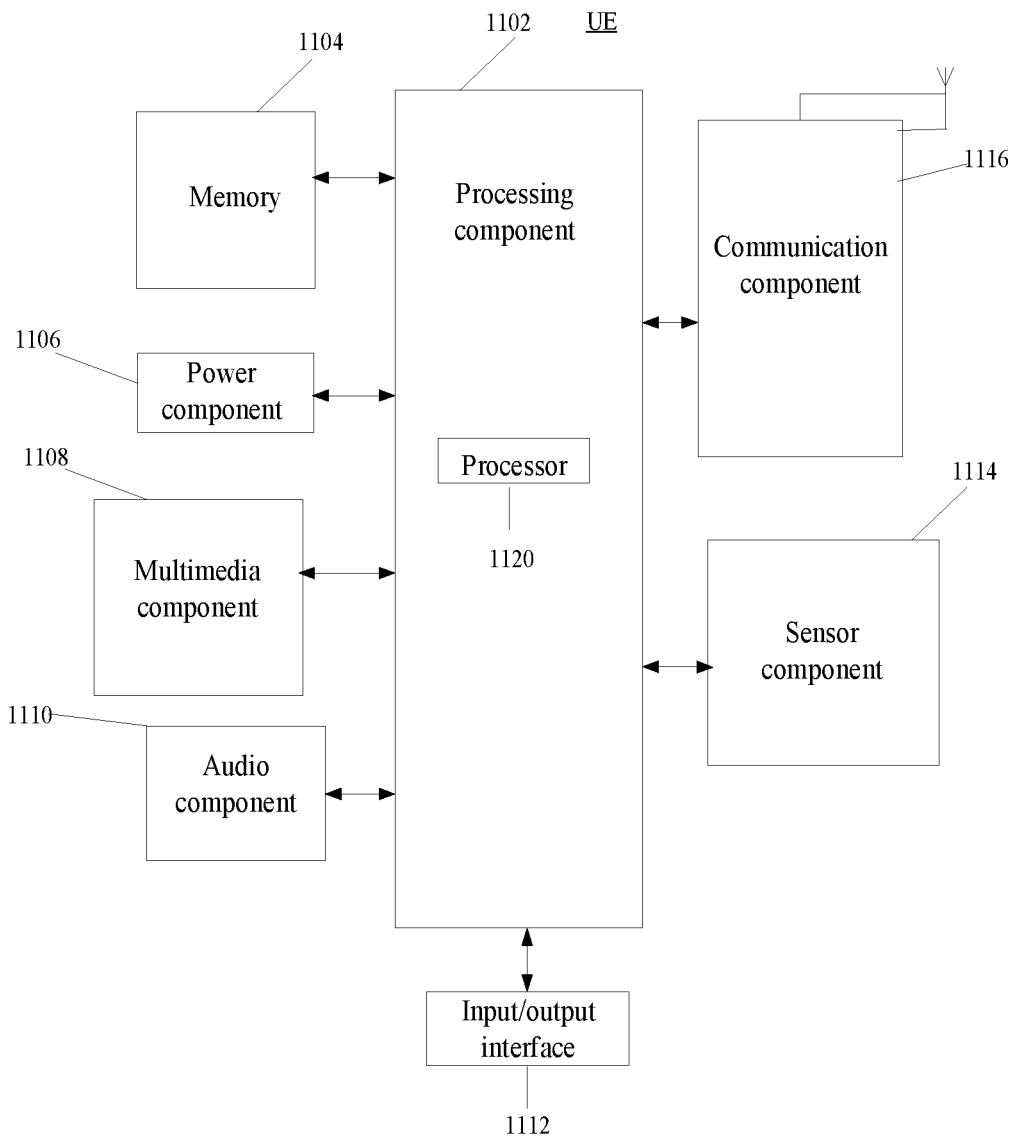
FIG. 11 is a structural diagram of a user equipment (UE) shown according to one exemplary embodiment.

FIG. 11 is a structural diagram of a user equipment (UE) shown according to one exemplary embodiment. For example, the user equipment (UE) may be a mobile phone, a computer, a digital broadcast terminal, a messaging device, a gaming console, a tablet device, a medical device, a fitness equipment, a personal digital assistant, and the like.

Referring to FIG. 11, the UE may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls the overall operations of the UE, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the UE. Examples of such data include instructions for any applications or methods operated on the UE, contact data, phonebook data, messages, pictures, videos, etc. The memory 1104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the UE. The power component 1106 may include a power management system, one or more power sources, and any other components associated with the generation, management, and distribution of power in the UE.

The multimedia component 1108 includes a screen providing an output interface between the UE and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1108 includes a front camera and/or a rear camera. The front camera and the rear camera may receive external multimedia data while the UE is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive external audio signals when the UE is in an operation mode, such as a call mode, a recording mode, and a voice recognition mode. The received audio signal may be further stored in the memory 1104 or transmitted via the communication component 1116. In some embodiments, the audio component 1110 further includes a speaker for outputting audio signals.

The I/O interface 1112 provides an interface between the processing component 1102 and peripheral interface modules, such as a keyboard, a click wheel, buttons, and the like. The buttons may include, but are not limited to, a home button, a volume button, a start button, and a lock button.

The sensor component 1114 includes one or more sensors to provide status assessments of various aspects of the UE. For instance, the sensor component 1114 may detect an on/off status of the UE, relative positioning of components, e.g., the display device and the mini keyboard of the UE, and the sensor component 1114 may also detect a position change of the UE or a component of the UE, presence or absence of user contact with the UE, orientation or acceleration/deceleration of the UE, and temperature change of the UE. The sensor component 1114 may include a proximity sensor configured to detect the presence of nearby objects without any physical contact. The sensor component 1114 may also include a light sensor, such as a CMOS or CCD image sensor, used for imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the UE and other devices. The UE can access a wireless network based on a communication standard, such as WiFi, 2G, or 3G, or a combination thereof. In an exemplary embodiment, the communication component 1116 receives broadcast signals or broadcast associated information from an external broadcast management system via a broadcast channel. In an exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 1104 including instructions, executable by the processor 1120 in the UE, for performing the above-described methods. For example, the non-transitory computer-readable storage medium may be a ROM, a RAM, a CD-ROM, a magnetic tape, a floppy disc, an optical data storage device, and the like.

The foregoing descriptions are merely preferred embodiments of the present disclosure, and are not intended to limit the present disclosure. Within the spirit and principles of the disclosure, any modifications, equivalent substitutions, improvements, etc., are within the scope of protection of the present disclosure.

Other embodiments of the present disclosure can be available to those skilled in the art upon consideration of the specification and practice of the invention disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A communication device, comprising:
   a processor; and
   a memory for storing a processor-executable instruction, wherein
   the processor is configured to:
   acquire system information of a plurality of base stations, wherein the system information comprises first bandwidth information of the base station, and the first bandwidth information is used to indicate an operating frequency range supported by the base station during carrier aggregation;
   select a target base station from the plurality of base stations based on a plurality of pieces of first bandwidth information and second bandwidth information that a user equipment (UE) is configured, wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation; and
   send a connection request to the target base station, wherein the connection request is used to instruct the UE to communicate with the target base station.

2. The communication device according to claim 1, wherein select a target base station from the plurality of base stations based on the plurality of pieces of first bandwidth information and second bandwidth information that the UE is configured, comprises:
   for each piece of first bandwidth information in the plurality of pieces of first bandwidth information,
   analyze an intersection between the operating frequency range indicated by the first bandwidth information and the operating frequency range indicated by the second bandwidth information;
   determine a frequency range of the intersection; and
   determine a base station with a largest frequency range of the intersection, as the target base station.

3. The communication device according to claim 1, the processor is further configured to:
   send, if synchronization information of a base station is acquired and system information of the base station is not acquired within a preset time period, a system information request to the base station, wherein the system information request is used to instruct the base station to send the system information to the UE.

4. A base station, comprising:
   a processor; and
   a memory for storing a processor-executable instruction, wherein
   the processor is configured to broadcast system information, wherein the system information comprises first bandwidth information of a base station, and the first bandwidth information is used to indicate an operating frequency range supported by the base station during carrier aggregation; and receive a connection request sent by a user equipment (UE), wherein the connection request is used to instruct the UE to communicate with the base station;
   wherein the connection request is a connection request sent by the UE to a target base station which is selected from a plurality of base stations based on a plurality of pieces of first bandwidth information and second bandwidth information that the UE is configured, and
   wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

5. A base station, comprising:
   a processor; and
   a memory for storing a processor-executable instruction, wherein
   the processor is configured to:
   receive a system information request sent by a user equipment (UE), wherein the system information request is used to instruct the base station to send system information to the UE;
   send the system information to the UE based on the system information request, wherein the system information comprises first bandwidth information of the base station, and the first bandwidth information is used to indicate an operating frequency range supported by the base station during carrier aggregation; and
   receive a connection request sent by the UE, wherein the connection request is used to instruct the UE to communicate with the base station;
   wherein the connection request is a connection request sent by the UE to a target base station which is selected from a plurality of base stations based on a plurality of pieces of first bandwidth information and second bandwidth information that the UE is configured, and
   wherein the second bandwidth information is used to indicate an operating frequency range supported by the UE during carrier aggregation, and the target base station refers to a base station that an operating frequency range supported thereby during carrier aggregation has a relatively larger intersection with the operating frequency range supported by the UE during carrier aggregation.

* * * * *